United States Patent
Buss

(10) Patent No.: US 10,773,721 B2
(45) Date of Patent: Sep. 15, 2020

(54) CONTROL METHOD USING TRAILER YAW RATE MEASUREMENTS FOR TRAILER BACKUP ASSIST

(71) Applicant: Ford Global Technologies, LLC, Dearborn, MI (US)

(72) Inventor: Brian George Buss, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/331,517

(22) Filed: Oct. 21, 2016

(65) Prior Publication Data
US 2018/0111621 A1    Apr. 26, 2018

(51) Int. Cl.
| | |
|---|---|
| *B60W 30/18* | (2012.01) |
| *B62D 13/06* | (2006.01) |
| *B62D 6/00* | (2006.01) |
| *B60W 10/18* | (2012.01) |
| *B60W 10/20* | (2006.01) |
| *B60W 30/06* | (2006.01) |
| *B62D 13/00* | (2006.01) |

(52) U.S. Cl.
CPC ...... *B60W 30/18036* (2013.01); *B60W 10/18* (2013.01); *B60W 10/20* (2013.01); *B60W 30/06* (2013.01); *B62D 6/003* (2013.01); *B62D 6/007* (2013.01); *B62D 13/005* (2013.01); *B62D 13/06* (2013.01); *B60W 2520/14* (2013.01); *B60W 2520/22* (2013.01)

(58) Field of Classification Search
CPC ....... B60W 30/18036; B60W 2520/22; B60W 10/18; B60W 10/20; B60W 30/06; B60W 2520/14; B62D 13/06; B62D 6/003; B62D 6/007; B62D 13/005

USPC .......................................................... 701/48
See application file for complete search history.

(56) References Cited

U.S. PATENT DOCUMENTS

| | | | |
|---|---|---|---|
| 3,542,390 A | 11/1970 | Fikse | |
| 3,756,624 A | 9/1973 | Taylor | |
| 3,860,257 A | 1/1975 | Mesly | |
| 4,042,132 A | 8/1977 | Bohman et al. | |
| 4,735,432 A | 4/1988 | Brown | |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Khoi H Tran
*Assistant Examiner* — Rodney P King
(74) *Attorney, Agent, or Firm* — Raymond Coppiellie; Price Heneveld LLP

(57) ABSTRACT

A system for assisting a vehicle in reversing a trailer includes a vehicle steering system, a vehicle sensor outputting a vehicle velocity and a trailer sensor outputting a trailer yaw rate. The system further includes a controller controlling the vehicle steering system in reversing the trailer to cause a control parameter based on the trailer yaw rate and the vehicle velocity to converge toward a predetermined value.

20 Claims, 10 Drawing Sheets

(56) References Cited

U.S. PATENT DOCUMENTS

| | | |
|---|---|---|
| 4,752,080 A | 6/1988 | Rogers |
| 4,848,499 A | 7/1989 | Martinet et al. |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,389,342 B1 | 5/2002 | Kanda |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,704,653 B2 | 3/2004 | Kuriya et al. |
| 6,838,979 B2 | 1/2005 | Deng et al. |
| 6,854,557 B1 | 2/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,546,191 B2 | 6/2009 | Lin et al. |
| 7,690,737 B2 | 4/2010 | Lu |
| 7,706,944 B2 | 4/2010 | Tanaka et al. |
| 7,715,953 B2 | 5/2010 | Shepard |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,139,109 B2 | 3/2012 | Schmiedel et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,227,474 B2 | 1/2016 | Liu |
| 9,229,453 B1 | 1/2016 | Lee |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,500,497 B2 | 11/2016 | Lavoie et al. |
| 9,616,923 B2 | 4/2017 | Lavoie et al. |
| 9,840,278 B2 | 12/2017 | Lavoie et al. |
| 2001/0037164 A1 | 11/2001 | Hecker |
| 2001/0052434 A1 | 12/2001 | Ehrlich et al. |
| 2004/0222881 A1 | 11/2004 | Deng et al. |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2008/0231701 A1 | 9/2008 | Greenwood et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1* | 8/2014 | Lavoie ............... G06F 17/00 701/41 |
| 2014/0236532 A1 | 8/2014 | Trombley et al. |
| 2014/0249691 A1 | 9/2014 | Hafner et al. |
| 2014/0249723 A1 | 9/2014 | Pilutti et al. |
| 2014/0267688 A1* | 9/2014 | Aich ............... H04N 7/181 348/113 |
| 2014/0267689 A1 | 9/2014 | Lavoie |
| 2014/0277942 A1* | 9/2014 | Kyrtsos ............ G01B 21/02 701/41 |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1* | 5/2015 | Lavoie ............... B62D 13/06 348/118 |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0001705 A1 | 1/2016 | Greenwood et al. |
| 2016/0009288 A1 | 1/2016 | Yu |

(56) References Cited

U.S. PATENT DOCUMENTS

| | | |
|---|---|---|
| 2016/0039456 A1 | 2/2016 | Lavoie et al. |
| 2016/0052548 A1 | 2/2016 | Singh et al. |
| 2016/0059888 A1 | 3/2016 | Bradley et al. |
| 2016/0129939 A1 | 5/2016 | Singh et al. |
| 2017/0101130 A1 | 4/2017 | Lavoie |
| 2017/0259850 A1 | 9/2017 | Yamashita et al. |
| 2017/0313351 A1 | 11/2017 | Lavoie |

FOREIGN PATENT DOCUMENTS

| | | | |
|---|---|---|---|
| DE | 9208595 | U1 | 8/1992 |
| DE | 10154612 | A1 | 5/2003 |
| DE | 102005043466 | A1 | 3/2007 |
| DE | 102005043467 | A1 | 3/2007 |
| DE | 102005043468 | A1 | 3/2007 |
| DE | 102006002294 | A1 | 7/2007 |
| DE | 102007029413 | A1 | 1/2009 |
| DE | 102006035021 | B4 | 4/2010 |
| DE | 102008043675 | A1 | 5/2010 |
| DE | 102009007990 | A1 | 8/2010 |
| DE | 102009012253 | A1 | 9/2010 |
| DE | 102010029184 | A1 | 11/2011 |
| EP | 0418653 | A1 | 3/1991 |
| EP | 1361543 | A2 | 11/2003 |
| EP | 1655191 | A1 | 5/2006 |
| EP | 1810913 | A1 | 7/2007 |
| EP | 2388180 | A2 | 11/2011 |
| EP | 2644477 | A1 | 10/2013 |
| FR | 2515379 | A1 | 4/1983 |
| JP | 09267762 | A | 10/1997 |
| JP | 10119739 | A | 5/1998 |
| JP | 2012166580 | A | 9/2012 |
| WO | 0044605 | A1 | 8/2000 |
| WO | 2012059207 | A1 | 5/2012 |
| WO | 2012103193 | A1 | 8/2012 |
| WO | 2013186208 | A2 | 12/2013 |
| WO | 2015187467 | A1 | 12/2015 |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwabisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe, Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

\* cited by examiner

CONTROL METHOD USING TRAILER YAW RATE MEASUREMENTS FOR TRAILER BACKUP ASSIST

FIELD OF THE INVENTION

The disclosure made herein relates generally to a system for aiding in reversing a trailer with a towing vehicle. More particularly, the present system uses a trailer yaw rate-based curvature control to maintain the vehicle-trailer combination generally along a desired backing path without monitoring hitch angle or knowing certain system parameters.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor and determine a steering input for the vehicle based on an input trailer curvature path and the estimated hitch angle. Such systems require the use of a kinematic model of the combined trailer and vehicle that includes the length of the trailer, more particularly, from the point of attachment with the vehicle to the front, or in some cases the effective axle thereof. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accordingly, improvements related to automated system estimation of trailer length in an accurate manner have been developed. Such improvements may require certain maneuvers over a period of time to function or to function acceptably well.

SUMMARY OF THE INVENTION

According to one aspect of the present disclosure, a system for assisting a vehicle in reversing a trailer includes a vehicle steering system, a vehicle sensor outputting a vehicle velocity and a trailer sensor outputting a trailer yaw rate. The system further includes a controller controlling the vehicle steering system in reversing the trailer to cause a control parameter based on the trailer yaw rate and the vehicle velocity to converge toward a predetermined value.

According to another aspect of the present disclosure, a vehicle includes a steering system, a sensor outputting a velocity of the vehicle, and a controller. The controller receives a trailer yaw rate from a trailer sensor coupled with the controller, determines a control parameter of the vehicle based on the vehicle velocity and the trailer yaw rate, and controls the vehicle steering system to cause the control parameter to converge toward a predetermined value.

According to another aspect of the present disclosure, a method for assisting a vehicle in reversing a trailer includes receiving a vehicle velocity signal, receiving a trailer yaw rate signal, and controlling a vehicle steering system by determining a control parameter of the vehicle reversing the trailer based on the vehicle velocity and the trailer yaw rate and causing the control parameter to converge toward a predetermined value.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
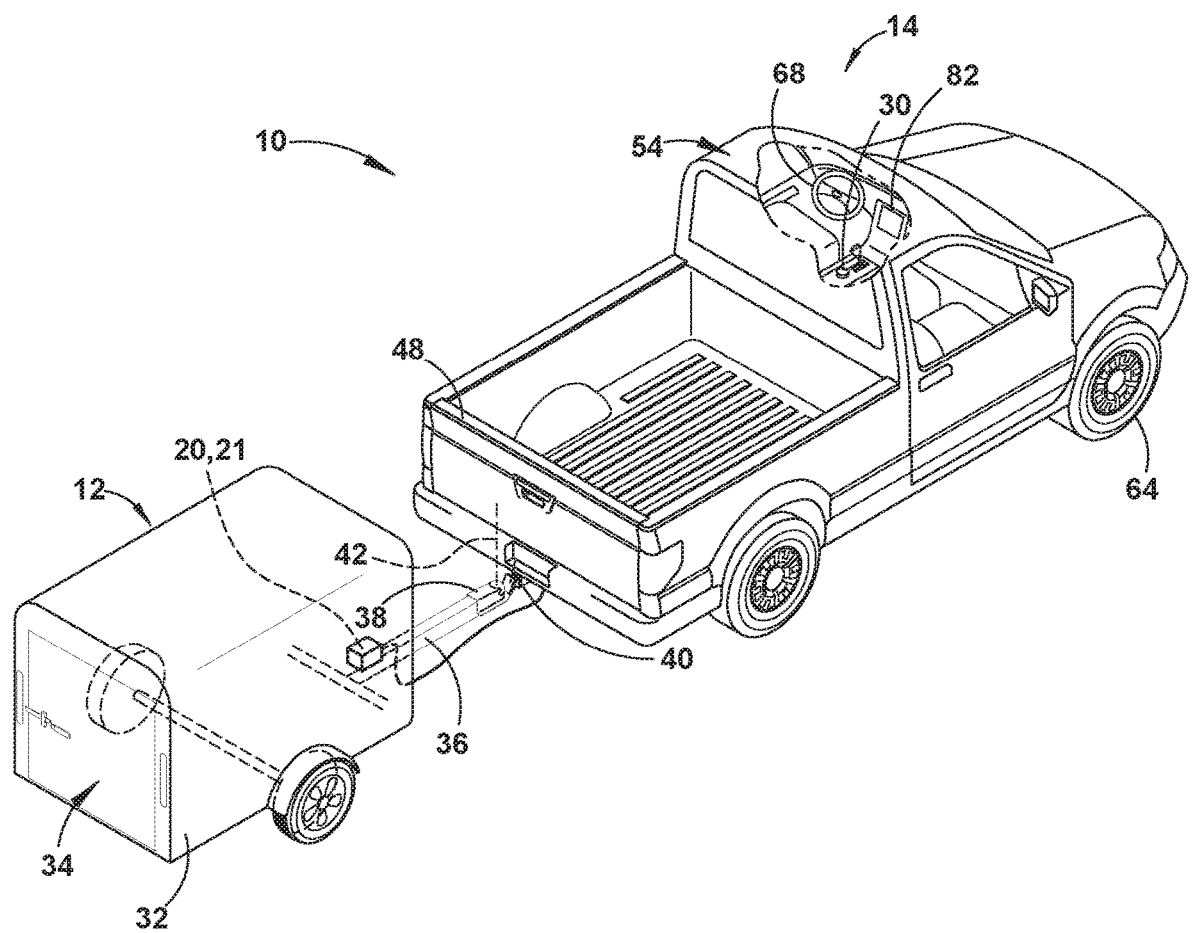
FIG. 1 is a top perspective view of a vehicle attached to a trailer with components of one embodiment of a trailer backup assist system included therein.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring to FIGS. 1-10, reference numeral 10 generally designates a system for assisting a vehicle 14 in reversing a trailer 12. System 10 includes a vehicle steering system 62, a vehicle sensor 17 outputting a vehicle velocity $v_1$, a trailer sensor 16 outputting a trailer yaw rate $\omega_2$, and a controller 28. The controller 28 controls the vehicle steering system 62 to cause a control parameter based on the trailer yaw rate $\omega_2$ and the velocity $v_1$ of the vehicle 14 in reversing the trailer 12 to converge toward a predetermined value. In an aspect, the control parameter may be a modified curvature $\eta$ of the vehicle 14 reversing the trailer 12 that is based on the vehicle velocity $v_1$ and the trailer yaw rate $\omega_2$. In a further aspect, the predetermined curvature may include a scaled curvature input k(t) representing a desired curvature input by a driver. It is further noted that the data "including a trailer yaw rate" can including data from which the trailer yaw rate can be derived including, for example the hitch angle rate and the like.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection defining the hitch location 42 that allows for articulation of the hitch angle $\gamma$. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Figure 2:
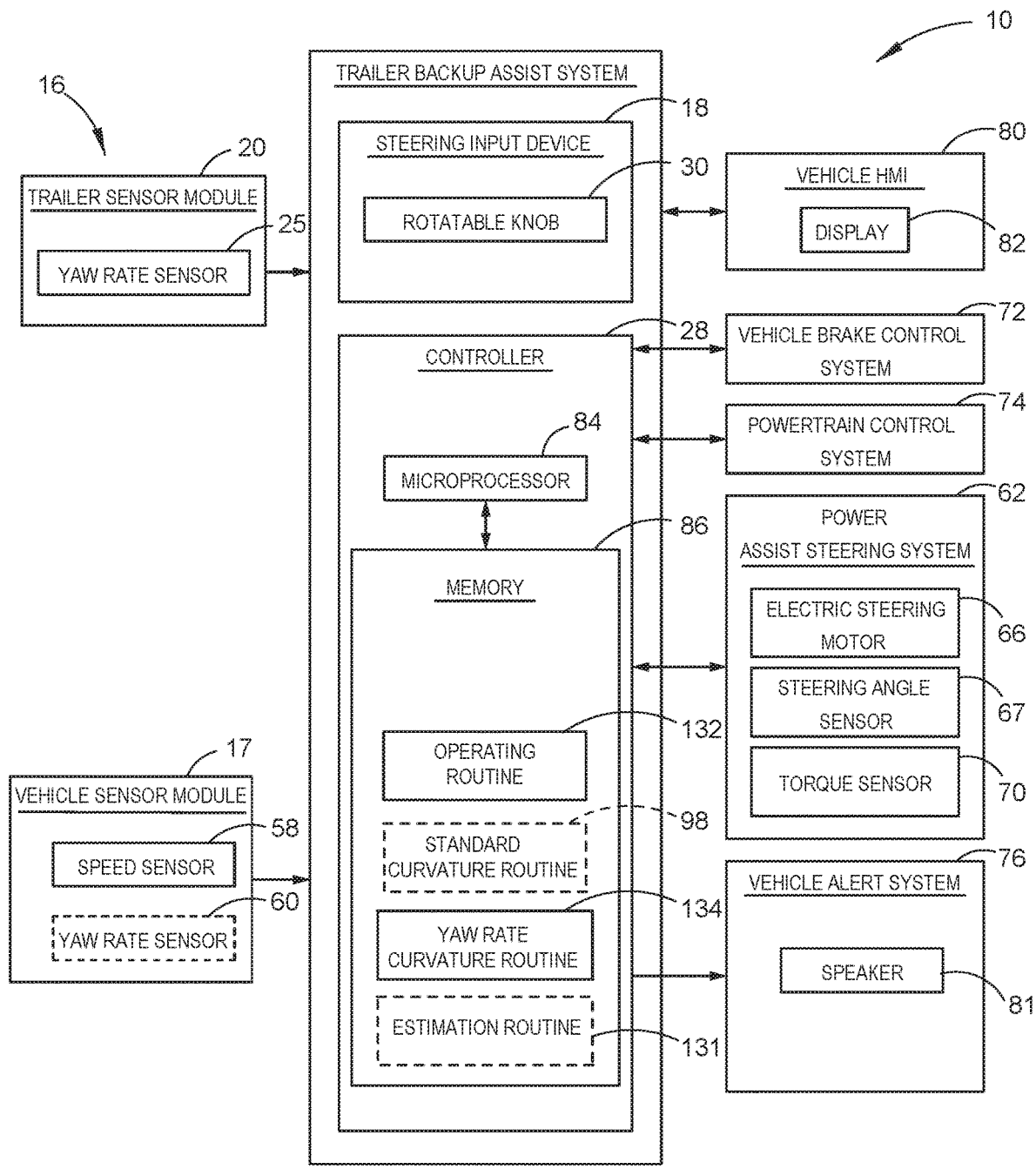
FIG. 2 is a block diagram illustrating one embodiment of the trailer backup assist system having a steering input device, a curvature controller, and a trailer braking system.

With additional reference to FIG. 2, the trailer sensor system 16 in the illustrated embodiment includes a sensor module 20 that may include a housed sensor unit 21 mounted on the tongue 36 of the trailer 12 proximate the enclosed cargo area 34. It is contemplated that the sensor unit 21 may be mounted on alternative portions of the trailer 12. The sensor module 20 generates a yaw rate signal $\omega_2$, via the included yaw rate sensor 25. It is further noted that the sensor module 20 may alternatively include left and right wheel speed sensors that can be used to calculate a yaw rate of the trailer or that the yaw rate may be computed from other quantities, such as measured or estimated hitch angle rate.

In the illustrated embodiment, the trailer yaw rate sensor 25 is contained within the housed sensor cluster 21, although other configurations are conceivable. It is contemplated that the sensor signal could be compensated and filtered to remove offsets or drifts, and smooth out noise. Further, the controller 28 may utilize processed signals received outside of the sensor system. The controller 28 of the trailer backup assist system 10 uses the trailer yaw rate $\omega_2$ to control the steering system 62, brake control system 72, and the powertrain control system 74, such as to assist backing the vehicle-trailer combination. Other vehicle information received by the trailer backup assist system 10 may include a speed of the vehicle 14 from a speed sensor 58 and a yaw rate of the vehicle 14 from a vehicle yaw rate sensor 60. It is contemplated that in additional embodiments, other vehicle sensors and devices may provide sensor signals or other information, such as proximity sensor signals or successive images of the trailer 12, that the controller 28 of the trailer backup assist system 10 may process with various routines to determine an indicator of the hitch angle $\gamma$, such as an indicator of the hitch angle $\gamma$ being within a certain range of hitch angles $\gamma$.

As further shown in FIG. 2, one embodiment of the trailer backup assist system 10 is in communication with the power assist steering system 62 of the vehicle 14 to operate the steered wheels 64 (FIG. 1) of the vehicle 14 for moving the vehicle 14 in such a manner that the curvature $\kappa_2$ of the trailer 12 as closely as possible matches that which is expected by the driver in inputting a desired curvature command k(t) (see FIG. 5) without actually determining the trailer curvature $\kappa_2$. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, in the same manner as the knob 30 described in greater detail herein.

Figure 5:
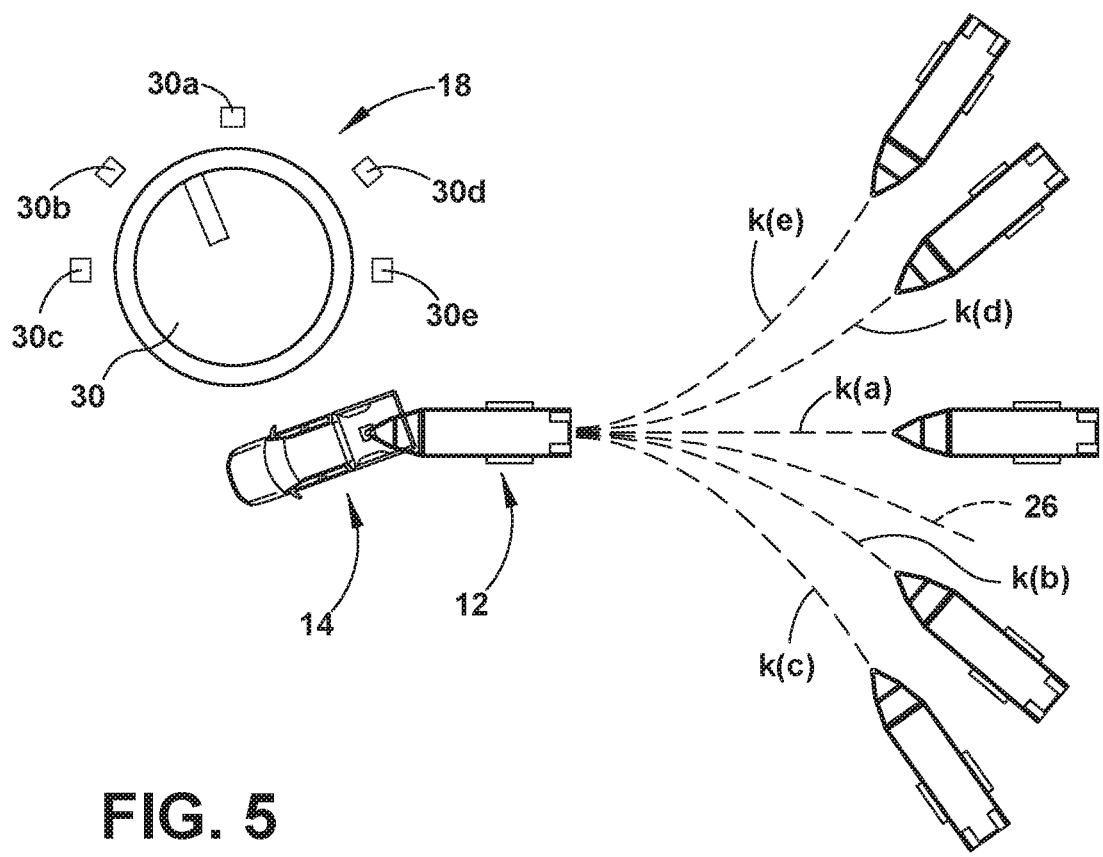
FIG. 5 is a plan view of another embodiment of a rotatable knob for selecting a desired curvature of a trailer and a corresponding schematic diagram illustrating a vehicle and a trailer with various trailer curvature paths correlating with desired curvatures that may be selected.
Figure 6:
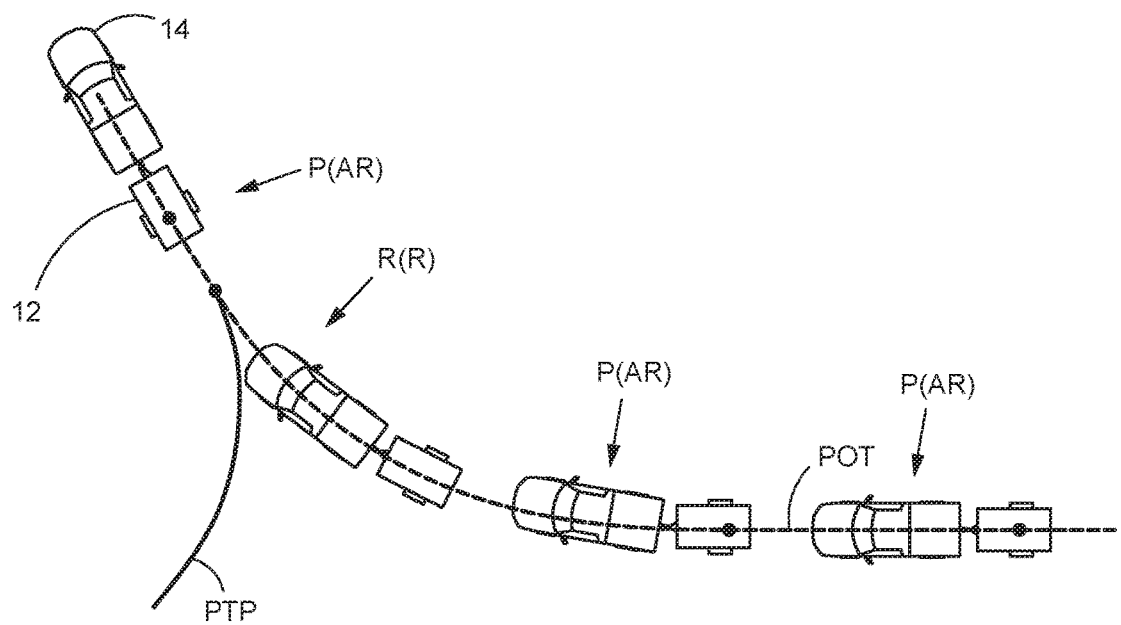
FIG. 6 is a schematic diagram showing a backup sequence of a vehicle and a trailer implementing various curvature selections with the trailer backup assist system, according to one embodiment.
Figure 7:
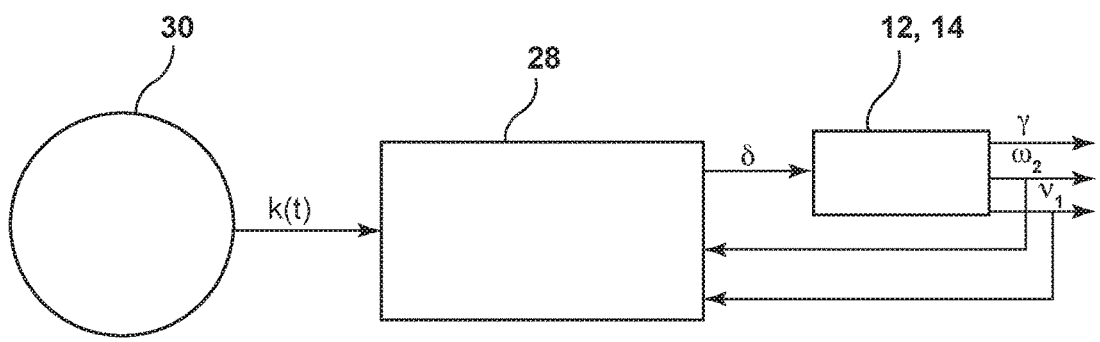
FIG. 7 is a schematic block diagram showing the trailer backup assist system with controller that takes vehicle velocity and trailer yaw rates as inputs to derive a steering angle command.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 close to the desired curvature 26 (FIG. 5). It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74 and the speed sensor 58, among other conceivable means. In some embodiments, individual wheel speeds can also be used to determine a vehicle yaw rate $\omega_1$, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, a light on the instrument panel or another indication may provide a visual alert and a vehicle speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 (FIG. 5) of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer 12.

As will be discussed below in more detail, the steering input device 18 according to one embodiment may include a movable control input device for allowing a driver of the vehicle 14 to command desired trailer steering actions to cause a control parameter based on the trailer yaw rate $\omega_2$ and the vehicle speed $v_1$ of the vehicle in reversing the trailer to converge toward a predetermined value, which may be based on a desired curvature path of the vehicle-trailer combination. In this manner, the steering input device may be considered a curvature input device. For instance, the moveable control input device may be the rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing the desired input, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a "yaw rate" curvature routine 134. Controller 28, in one embodiment, may also incorporate an estimation routine 131, an operating routine 132, and a "standard" curvature routine 98 (described further below). It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
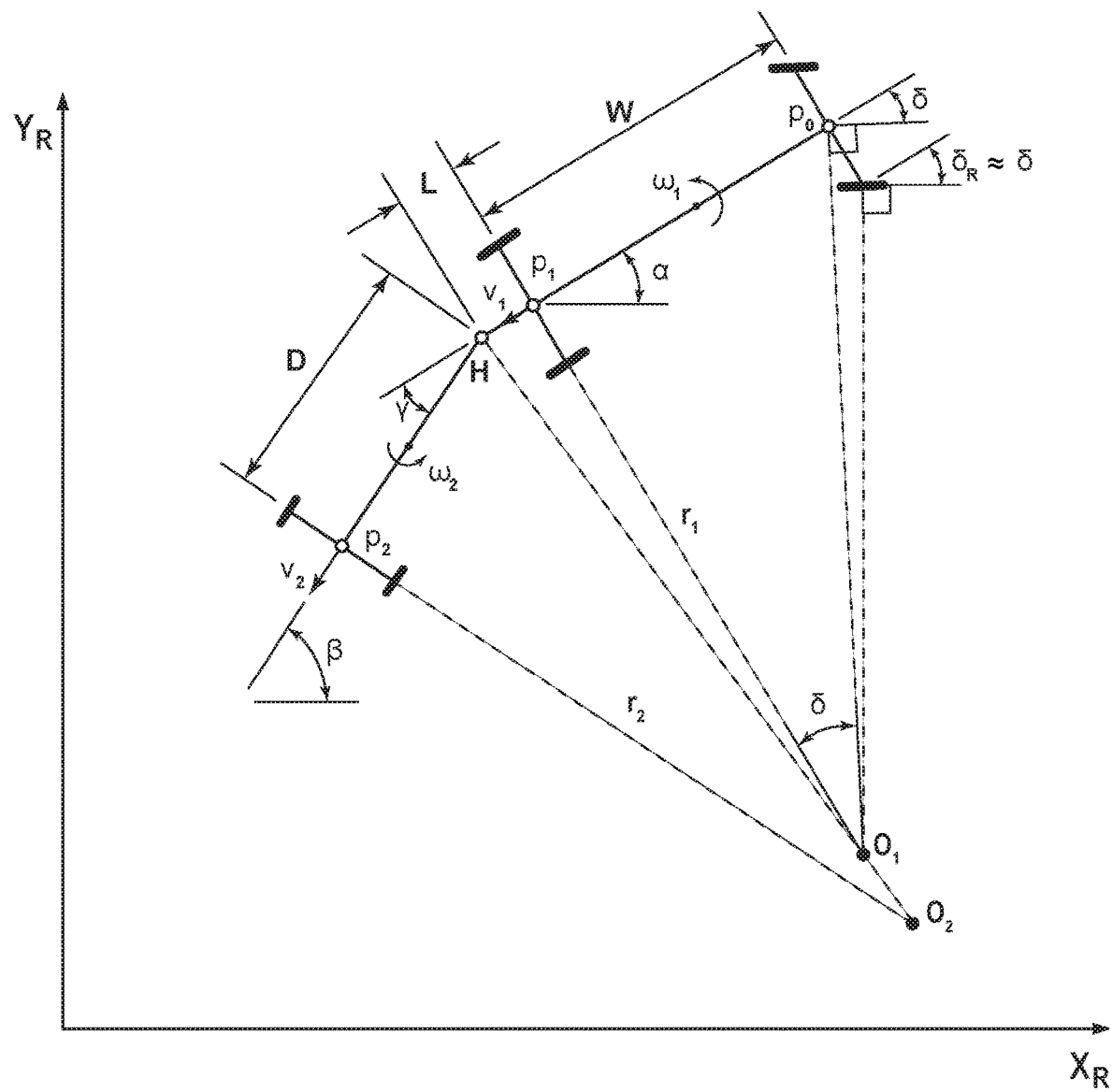
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

A method has been established for controlling the curvature of a conventional trailer 12 while backing. Such method takes advantage of the offset between the hitch 40 and the rear vehicle axle to directly adjust the trailer curvature $\kappa_2$ by appropriate commands to steering system 62. Such a control scheme relies on knowledge of the trailer length and the instantaneous hitch angle and was developed by studying the scenario of backing a trailer 12 using tow vehicle 14 at slow speeds, where vehicle dynamics are negligible, and on a rigid, flat surface with sufficient friction to prevent tire slip. Under these conditions, and as illustrated in FIG. 3, the differential kinematics of the vehicle trailer system is given by:

$$\dot{\gamma} = v_1 \frac{\sin\gamma}{D} - v_1\left(1 + \frac{L}{D}\cos\gamma\right)\frac{\tan\delta}{W}, \quad (1)$$

where:

$\gamma = \beta - \alpha$ is the hitch angle, $v_1$ is the velocity of a midpoint of the rear axle of the tow vehicle 14, $\delta$ is the road wheel angle (or steering angle) of the tow vehicle 14, measured along a midpoint between the steered wheels 64, L is the hitch offset, D is the trailer 12 length (from hitch to the effective axle), and W is the tow vehicle wheelbase.

The hitch angle is taken to be positive when to the right side of a longitudinal axis of vehicle 14.

The convention that $v_1 \geq 0$ when the vehicle is in reverse is also taken.

The vehicle 14 curvature $\kappa_1$ is defined as the curvature of a path traced by the midpoint of the rear axle of vehicle 14. The trailer 12 curvature $\kappa_2$ is defined analogously as the curvature of a path traced by the midpoint of the axle of the trailer 12. The vehicle 14 and trailer 12 curvatures $\kappa_1, \kappa_2$ are, respectively, given by:

$$\kappa_1 = \frac{\tan\delta}{W}, \quad (2)$$

$$\kappa_2 = \frac{\sin\gamma - L\kappa_1\cos\gamma}{D(\cos\gamma + L\kappa_1\sin\gamma)}. \quad (3)$$

The vehicle 14 and trailer 12 curvatures $\kappa_1, \kappa_2$ can also be computed as $\kappa_1 = \omega_1/v_1$ and $\kappa_2 = \omega_2/v_2$, where $\omega_1 = \dot{\alpha}$ is the vehicle yaw rate, $\omega_1 = \dot{\beta}$ is the trailer yaw rate, and $v_2$ is the velocity of the midpoint of the axle of the trailer 12.

Figure 8:
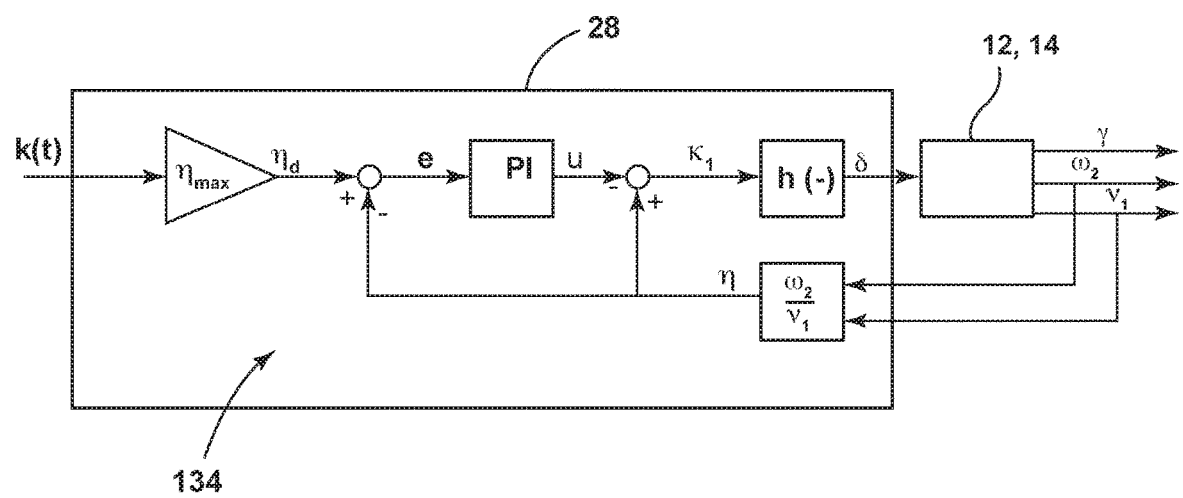
FIG. 8 is a schematic block diagram illustrating the trailer backup assist system with a modified curvature based controller.

In one aspect, the road wheel angle $\delta$ can be regarded as the control input into the dynamic system (as given in equation (1), above). However, in light of equation (2), it is possible, as an alternative, to use the vehicle curvature $\kappa_1$ as the control input. Doing so not only simplifies many of the expressions that follow, but also aids in establishing a number of useable geometric relationships within the system. Accordingly, herein the control laws for system 10 are expressed in terms of curvature $\kappa_1$, or its equivalent tan ($\delta$)/W. Because a physical implementation of the control law ultimately includes the conversion to a wheel angle $\delta$, the conversion is shown in block diagrams (e.g., as shown in FIG. 8) as $\delta = h(\cdot)$, where $$h(\kappa_1) := \tan^{-1}(W\kappa_1). \quad (4)$$

If it is assumed, as stated above, that the steering angle $\delta$ is limited such that $|\delta| \leq \delta_{max} < 90°$, it is implicit that the vehicle has a maximum curvature of $\kappa_{1,max} = \tan(\delta_{max})/W$. As a result, there may be some hitch angles from which it is impossible to straighten out the trailer 12 without driving forward. Whenever the trailer 12 is in such a configuration, it is said to be "jackknifed". The smallest positive hitch angle for which the trailer 12 is jackknifed is the jackknife angle $\gamma_{jk}$. The jackknife angle $\gamma_{jk}$ is understood to be a special case of equilibrium hitch angle; specifically, the jackknife angle $\gamma_{jk}$ is one of two equilibria associated with the road wheel angle $\delta = \delta_{max}$.

To find the equilibria, the right hand side of (1) is set as equal to zero and $\gamma$ is solved for as a function of trailer curvature $\kappa_1$, trailer length D, and hitch offset L. As shown in equation (3), the solution involves a quadratic equation, and therefore defines a pair of functions $\Gamma_+$ and $\Gamma_-$ which differ only in one operation (addition or subtraction, as indicated by the subscript). These two functions are expressed succinctly as $$\Gamma_\pm(\kappa_1, D, L) = sgn(\kappa_1)\cos^{-1}\left(\frac{-DL\kappa_1^2 \pm \sqrt{1-(D^2-L^2)\kappa_1^2}}{1+L^2\kappa_1^2}\right). \quad (5)$$

Notably, there are no equilibria when $D^2 - L^2 > 1/\kappa_1^2$, or equivalently, when $D > D_{max}(\kappa_1)$, where:

$$D_{max}(\kappa_1) = \sqrt{1/\kappa_1^2 + L^2}.$$

It follows, then, that because the jackknife angle $\gamma_{jk}$ corresponds to the solution given by $\Gamma_+$ (that is, $\gamma_{jk} = \Gamma_+(\kappa_{1max}, D, L)$), a jackknife condition is not possible when $D > D_{max}(\kappa_{1,max})$.

The control methodology discussed thus far has been incorporated into a trailer backup assist ("TBA") framework where the driver provides reference commands to the controller 28, and the controller 28 determines an appropriate steering wheel angle $\delta$ in order to meet certain objectives including, but not limited to, steering the combined vehicle 14 and trailer 12 according to the reference command. The driver reference herein is interpreted as a normalized trailer curvature command k(t). The controller objectives are to prevent jackknife and to drive the trailer curvature $\kappa_2$ approximately to a desired curvature that corresponds with the normalized commanded curvature k(t).

Because both the jackknife angle $\gamma_{jk}$ and the general responsiveness of system 10 are dependent on the trailer length D and the hitch offset L, a direct determination of the maximum trailer curvature $\kappa_{2,max}$ requires knowledge of trailer length D and the hitch offset L. In this manner, previously-developed TBA systems have required both trailer length D and the hitch offset L to be known by system 10 prior to initiation of what may be considered a parameter-based control, as it requires the prior knowledge or input of system parameters (i.e. trailer length D and hitch offset L), and is referred to herein as the "standard" curvature control routine 98 (FIG. 2). An example of such a system implements a control scheme based on equations (1)-(5) and is more fully described in U.S. Pat. No. 8,909,426 ("the '426 patent"), the entire disclosure of which is incorporated herein by reference. It is noted that the variation of system 10 discussed in the '426 patent measures the hitch angle $\gamma$ directly, such as by the use of camera to track the location of a trailer target, although other processes or devices can be used to measure hitch angle $\gamma$, examples of which are discussed below.

Existing TBA systems may require an operator to measure the trailer length D and the hitch offset L for input into system memory or may include the capability to estimate the trailer length D and the hitch offset L. Both of these variations exhibit certain drawbacks, such as the introduction of human error and/or the inability for the systems to operate immediately upon connecting, for example, a new trailer 12 with the vehicle 14. Accordingly, the present TBA controller 28 and method incorporates a trailer yaw rate-based routine 134 that uses trailer yaw rate $\omega_2$ measurements, but does not require knowledge or estimates of instantaneous hitch angle $\gamma$, trailer length D, or hitch offset L in order to ensure stability and jackknife avoidance. As disclosed below the trailer yaw rate-based routine 134 may, more particularly, be a modified curvature-based routine, and may be referred to as such, as the modified curvature described herein is determined including the trailer yaw rate $\omega_2$. It is noted that, in other embodiments, controller 28 can use trailer yaw rate $\omega_2$ and vehicle velocity $v_1$ measurements to track a control parameter that is different from the modified curvature $\eta$ discussed herein, but, in a similar manner, tracks stability of the trailer 12 and vehicle 14 system to control vehicle 14 in reversing trailer 12 while maintaining a hitch angle $\gamma$ below the jackknife angle $\gamma_{jk}$ using the trailer yaw rate $\omega_2$ as an input and accordingly falls within the discussion of the trailer yaw rate-based routine 134. In the present example, the control method utilizing the modified curvature $\eta$ can control the trailer 12 close to jackknife without the addition of overly-conservative supplemental measures. Further, the present system 10 and related method is applicable to fifth wheel and conventional trailers 12, and relies on a choice of a controlled variable different from the trailer curvature $\kappa_2$ used in the standard control routine 98, as discussed above. As discussed herein, the variable is referred to as the modified trailer curvature $\eta$. Notably, when the hitch angle $\gamma$ is small, the modified curvature $\eta$ is approximately equal to the trailer curvature $\kappa_2$, making it an intuitive quantity for a driver to command.

Figure 4:
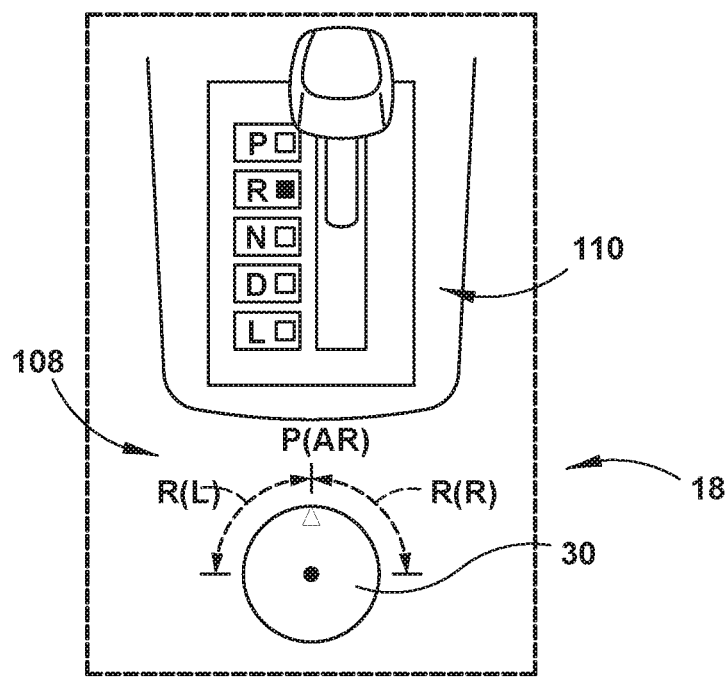
FIG. 4 is a plan view of a steering input device having a rotatable knob for operating the trailer backup assist system, according to one embodiment.

As shown in FIGS. 4 and 5, the disclosed TBA system 10 provides the knob 30 for driver input. As illustrated in FIG. 5, the driver indicates the desired direction and curvature of the backing path by turning the knob 30. The various positions of knob 30a-30e are interpreted by the controller as requests to cause the trailer to follow paths similar to $\kappa(a)$-$\kappa(e)$. According to an implementation of system 10, position 30a can correspond to an at-rest position P(AR) of knob 30 (which may be spring-biased to such a position), which corresponds to backing along a substantially straight path $\kappa_a$, and various other positions 30b,30c being within a left range R(L) and the other positions 30d,30e being within a right-side range R(R) of the motion of knob 30. In an embodiment, the knob angle $\theta_{knob}$ may be mapped into the interval [-1, 1] by some (possibly nonlinear) function k. Since the knob angle $\theta_{knob}$ is a function of time, the value $k(\theta_{knob}(t))$ of the mapping function is also a function of time. For convenience, this time-varying quantity is called a "normalized curvature command", and is denoted simply k(t). When using the standard curvature routine 98, this time varying quantity may be scaled by a maximum trailer curvature $\kappa_{2,max}$ to compute the desired curvature $\kappa_d(t) = \kappa_{2,max}k(t)$. Selection of a suitable value of the scaling constant $\kappa_{2,max}$ is usually dependent on the trailer length D and the hitch offset L, since the range of trailer curvatures for which the system 10 is not jackknifed and for which the system 10 is able to quickly follow curvature commands depends on D and L. But when using a yaw-rate-based controller as disclosed herein, the normalized curvature command is scaled by a different constant $\eta_{d,max}$ to compute the desired modified curvature $$\eta_d(t) := \eta_{d,max} k(t). \tag{6}$$

Selection of the maximum modified curvature $\eta_{d,max}$ does not require a knowledge of D and L, but only an upper limit $D_{upper}$ on the length of any trailer that will be used with the system. Given $D_{upper}$ and the maximum vehicle curvature $\kappa_{1,max}$, $\eta_{d,max}$ can be chosen as any positive constant less than $\min(1/D_{upper}, \kappa_{1,max})$. The actual curvature $\kappa_2$ of the path followed by the trailer in response to a modified curvature command $\eta_d = \eta_{d,max} k(t)$ will be similar, but not necessarily equal, to $\kappa_{2,max} k(t)$. In this way, the normalized curvature input k(t) can be thought of in terms of the desired backing path for trailer 12, independent of whether the system 10 uses the standard or the yaw-rate-based curvature controller disclosed herein.

As shown in FIG. 8, in using the modified curvature variation of routine 134, controller 28 takes driver input k(t)∈[-1, 1], representing the normalized desired trailer curvature, in the same manner as discussed above, and trailer yaw rate measurement $\omega_2(t)$, and determines an appropriate road wheel angle $\delta$ to prevent jackknife. Furthermore, the controller 28 drives the trailer curvature $\kappa_2$ to a value similar to the curvature that would be achieved using the standard curvature controller. This approximate asymptotic curvature tracking is achieved without inputs for hitch angle $\gamma$ and without computing the maximum curvature $\kappa_{2,max}$ or the jackknife angle $\gamma_{jk}$ (which would require knowledge of trailer length D and hitch offset L).

As used herein the modified trailer curvature is defined as:

$$\eta = \frac{\sin\gamma}{D} - \frac{L\cos\gamma}{D}\frac{\tan\delta}{W}. \tag{7}$$

Rewriting the hitch angle dynamics from equation (1) in terms of modified curvature η results in the equation:

$$\dot{\gamma} = v_1 \eta - v_1 \frac{\tan\delta}{W}. \qquad (8)$$

Because $\dot{\gamma}=\omega_2-\omega_1$ and $\omega_1=v_1 \tan(\delta)/W$, it can be determined that $\omega_2 = v_1 \eta$, or, when $|v_1|>0$, $$\eta = \frac{\omega_2}{v_1}. \qquad (9)$$

Thus, as long as the vehicle is moving, it is possible to compute the modified curvature η from measurements of vehicle velocity $v_1$ and trailer yaw rate $\omega_2$ without knowing hitch angle γ, trailer length D, or hitch offset L.

Figure 9:
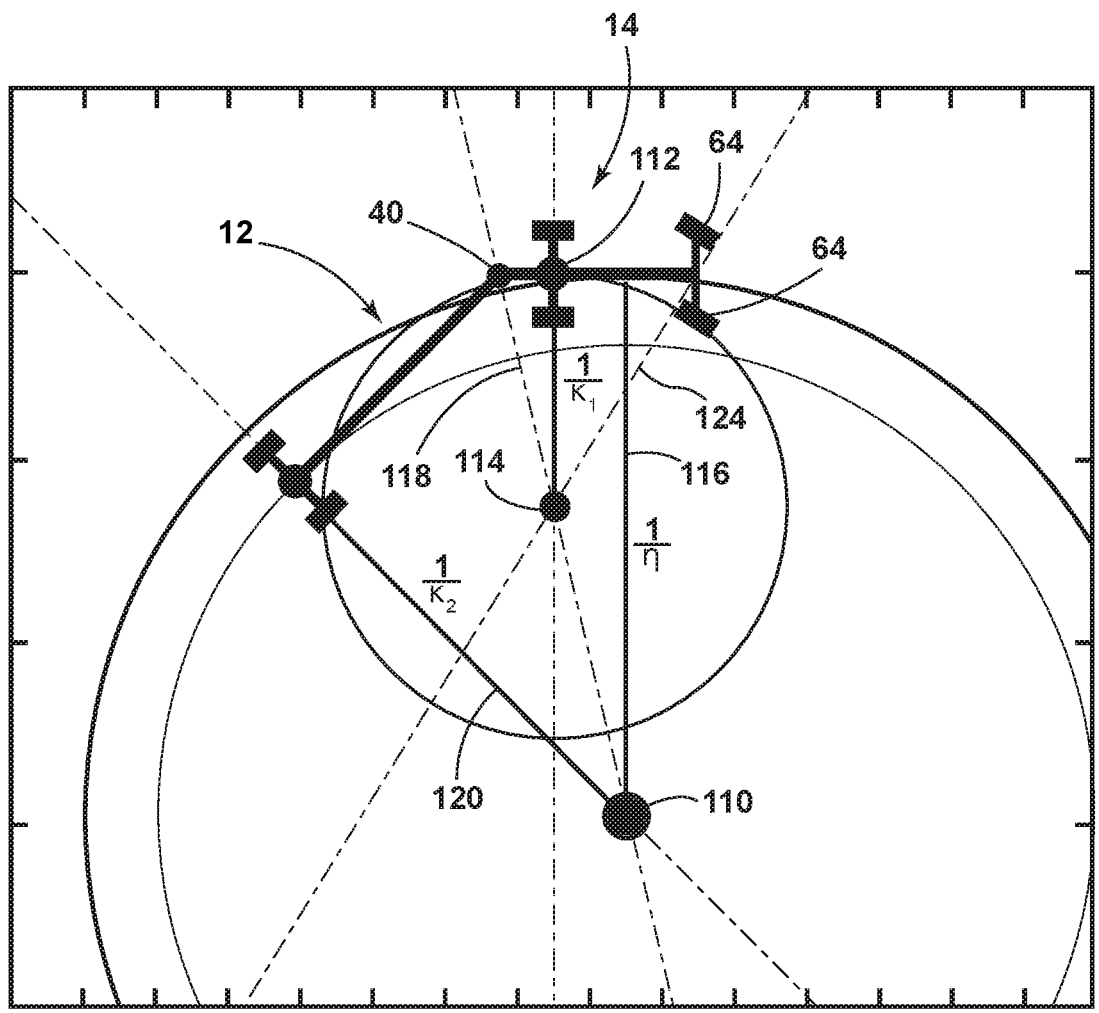
FIG. 9 is a schematic depiction of the geometry of the vehicle and trailer, illustrating a relationship between the vehicle curvature, the trailer curvature, and the modified curvature.

As shown in FIG. 9, 1/η is the lateral position of the trailer 12 center of rotation 110 relative to the longitudinal axis 112 of the vehicle 14; that is, the inverse of the modified curvature η is the distance between the longitudinal axis 112 of the vehicle 14 and the rotation center 110 along line 116.

The trailer curvature $\kappa_2$ is related to the modified curvature by:

$$\kappa_2 = \frac{\omega_2}{v_2} = \frac{1}{\cos\gamma + L\sin\gamma \frac{\tan\delta}{W}} \eta. \qquad (10)$$

From this it can be seen that the modified hitch angle η is approximately equal to the trailer curvature $\kappa_2$ when the hitch angle γ is small. The center of rotation 110 of the trailer 12 is collinear with the hitch location 40 and the center of rotation 114 of the vehicle 14 and lies along the line 120 perpendicular to the trailer 12 wheels. The modified curvature η is the reciprocal of the length of the perpendicular line segment 116 from the center of rotation 110 of the trailer 12 to the vehicle 14 longitudinal axis 112. In equilibrium, the two centers of rotation 110 and 114 coincide such that the vehicle curvature $\kappa_1$ is equal to the modified curvature η.

Although it is possible to derive a feedback law for the dynamic equation (8), it is noted that the resulting closed loop system would have velocity-dependent behavior. Alternatively, it is possible to rewrite the hitch angle dynamics $\dot{\gamma}$ in terms of the distance $s_1$ traveled by the rear vehicle 14 axle. Because $v_1 = ds_1/dt$, the chain law implies that:

$$\frac{d\gamma}{ds_1} = \eta - \frac{\tan\delta}{W}. \qquad (11)$$

From this, we see that the hitch angle is in equilibrium $\bar{\gamma}$ precisely when the modified curvature η is equal to the vehicle curvature $\kappa_1$. It also follows that the jackknife angle $\gamma_{jk}$ corresponds to one particular equilibrium with $|\delta|=\delta_{max}$, or $|\eta|=\kappa_{1,max}$.

The preceding observations justify regarding the driver input k(t) as a normalized, desired modified curvature command, which can be formalized through the definition:

$$\eta_d(t) := \eta_{d,max} k(t). \qquad (12)$$

This relationship can be considered within the feedback control law:

$$\frac{\tan\delta}{W} = \eta - u, \qquad (13)$$

where:

$$u = K_p e(t) + K_i \int_{t_0}^{t} e(\tau) v_1(\tau) d\tau; \qquad (14)$$

and:

$$e(t) = \eta_d(t) - \eta(t). \qquad (15)$$

As in the trailer curvature $\kappa_2$ based control scheme, the vehicle curvature $\kappa_1$ is taken as the control input, instead of the road wheel angle δ (with $\kappa_1 = \tan(\delta)/W$). The controller 28 structure is depicted in FIG. 8, where the controller output $(\delta)/W$ is denoted by $\kappa_1$.

For any constant curvature command $\eta_d$ such that $|\eta_d|<1/\sqrt{(D^2-L^2)}$, there is a unique equilibrium hitch angle $\bar{\gamma}$ in the interval $[-\gamma_{max}, \gamma_{max}]$, where $\gamma_{max} = \cos^{-1}(-L/D)$. This equilibrium is given by $\bar{\gamma} = \Gamma_+(\eta_d, D, L)$. When L=0, the modified curvature is simply $\eta = \sin(\gamma)/D$. Accordingly, it is proposed that the equilibrium $\bar{\gamma}$ is locally asymptotically stable as long as $K_p>0$, $K_i \geq 0$, and $|\bar{\gamma}|<\min(\gamma_{jk}, 90°)$.

In general, it can be shown that local asymptotic stability of the equilibrium $(\bar{\gamma}, 0)$, $|\bar{\gamma}|<\min(\gamma_{jk}, \gamma_{max})$ can be maintained by any choice of gains satisfying $0<K_p<K_{p,max}$ and $0 \leq K_i < K_{i,max}$, where:

$$K_{p,max} := \begin{cases} -\frac{D + L\cos\bar{\gamma}}{L\cos\bar{\gamma}}, & \text{when } L\cos\bar{\gamma} < 0 \\ \infty, & \text{otherwise,} \end{cases} \qquad (16)$$

$$K_{i,max} := \begin{cases} -\frac{K_p(L + D\cos\bar{\gamma})}{L\cos\bar{\gamma}(D + L\cos\bar{\gamma})}, & \text{when } L\cos\bar{\gamma} < 0 \\ \infty, & \text{otherwise.} \end{cases} \qquad (17)$$

It follows, then, that an appropriate choice of feedback gains can be made after determining limits on the acceptable range of trailer lengths D (specifically, a minimum allowable trailer length D) and hitch offsets L. The upper limit $K_p < K_{p,max}$ is of particular relevance with respect to the implementation of system 10. In particular, when the limit is not satisfied, the equilibrium will not be stable; instead, the hitch angle may oscillate in a region around the equilibrium. This behavior is a consequence of the feedback implementation, as explained below.

Figure 10:
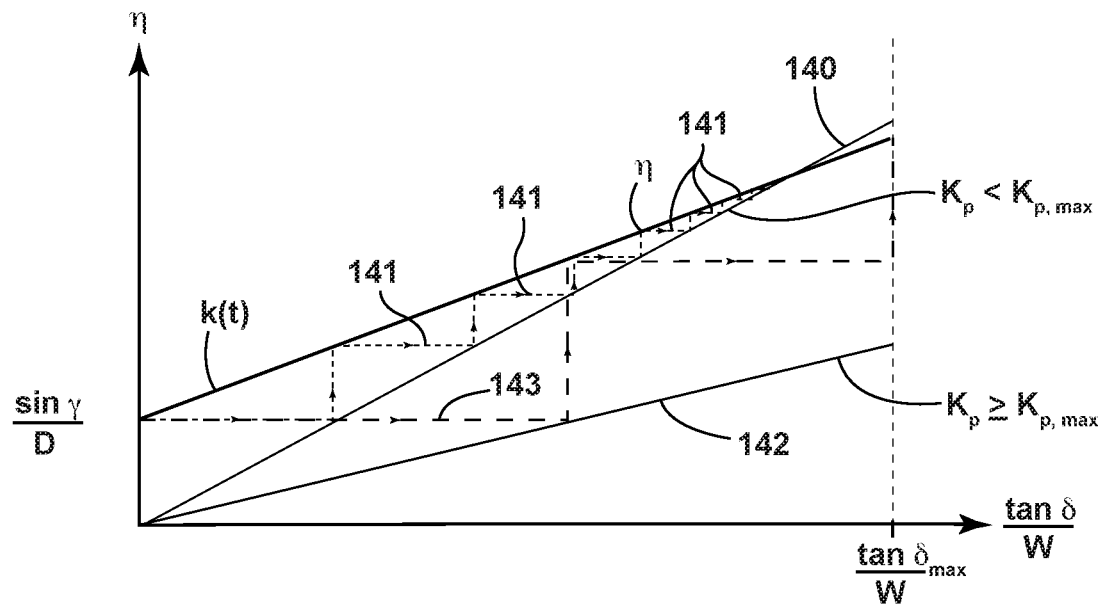
FIG. 10 is a graph illustrating the effects of two different choices of proportional control gain on a system implementing a modified curvature control scheme.

When $L \neq 0$, there is an algebraic relationship between the vehicle curvature $\kappa_1$ and the modified curvature η given in equation (7). The control law of equations (13)-(14) imposes an additional algebraic relationship between these two quantities. In the implementation of the control law within system 10, the vehicle-trailer kinematics interacts with the controller 28 to determine a solution to the algebraic system of equations. However, the solution process is iterative, with the controller 28 first measuring the modified curvature η, then updating the vehicle curvature $\kappa_1$ to then derive the steering angle corresponding to that curvature $\kappa_1$ (using $\kappa_1 = \tan(\delta)W$), which in turn changes the modified curvature η. As illustrated in FIG. 10, when $K_p < K_{p,max}$, the system 10 converges, through iterations 141, to the particular vehicle curvature $\kappa_1$ that represents a solution to the algebraic equations.

If the proportional gain is to high ($K_p \geq K_{p,max}$), the system 10 will, through iterations 143, increase the steering angle δ until the error changes in sign or until the steering angle δ reaches the maximum steering angle $\delta_{max}$. The steering angle $\delta$ may then alternate between $+\delta_{max}$ and $-\delta_{max}$, as the hitch angle $\gamma$ oscillates in an interval around the equilibrium hitch angle. In this manner, the real-world system in which the restriction $K_p < K_{p,max}$ is not satisfied may still act to prevent the trailer 12 from reaching a jackknife condition, although the behavior may be uncomfortable to the driver and may not accurately maintain the commanded curvature k(t).

In this manner, controller 28 stabilizes the hitch angle dynamics $\dot{\gamma}$ with a large basin of attraction, providing a foundation for the described trailer backup system 10 that can operate without measurements for hitch angle $\gamma$, trailer length D, or hitch offset L. The modified curvature $\eta$ can be used to implement additional functionality and various controller modifications can be added for improved real-world performance.

Controller 28 is able to track desired modified curvature commands $\eta_d$ and to prevent jackknife as long as the initial hitch angle $\gamma$ is controllable (i.e. the system 10 is not initially jackknifed). However, if the trailer is initially jackknifed, then it is not possible to control the hitch angle $\gamma$ without driving forward. Because of this, system 10 implements a scheme to detect when jackknife has occurred in order to be able to alert the driver. System 10 further includes a measure of detecting the proximity of system 10 to jackknife and of implementing speed limiting functionality when such proximity is detected.

Recalling the previous explanation, the system is said to be jackknifed when the hitch angle $\gamma$ is locally uncontrollable, in other words, when the hitch angle $\gamma$ is such that there is no admissible choice of wheel angle which reverses the sign of $d\gamma/ds_1$ (or, equivalently, of $\dot{\gamma}$). The boundary of the jackknife region corresponds to the equilibrium $\bar{\eta} = \kappa_{1,max}$. Based on this definition, one method to detect jackknife is to detect the sign of $\dot{\gamma}$ as soon as the vehicle 14 starts moving, then to immediately drive the wheel angle $\delta$ to its limit in the proper direction. If the sign of $\dot{\gamma}$ changes, then the system is not jackknifed.

In some conditions, however, it is desirable to detect jackknife and to determine proximity to jackknife without saturating the wheel angle $\delta$, even if such methods are approximate. In one example, when it is known that L=0, the modified curvature makes these problems trivial. In this case, the modified curvature $\eta$ is independent of the wheel angle $\delta$, so it is sufficient to compare the instantaneous value of $\eta$ to $\kappa_{1,max}$; if $|\eta| \geq \kappa_{1,max}$, then the system is jackknifed. Furthermore, the function $\rho_0(\eta) := \eta/\kappa_{1,max}$ can be used in such an instance to provide a measure of the proximity to jackknife, with small values (i.e. $\rho_0(\eta) \ll 1$) indicating a large jackknife margin, and values closer to unity indicating a smaller jackknife margin.

For general hitch offset L, the value $\rho_0(\eta)$ provides a measure of the proximity to jackknife when the system is in equilibrium, that is, when $\eta = \kappa_1$. Thus, one heuristic measure of "proximity" to jackknife is the absolute value of the function:

$$\rho(\eta, \kappa_1) = \frac{\eta + c(\eta - \kappa_1)}{\kappa_{1,max}}, \quad (18)$$

where c is a constant parameter and satisfies $0 \leq c < 1$. The use of the constant c penalizes deviations from equilibrium that tend to drive the hitch angle $\gamma$ closer to jackknife. The controller 28 can utilize the quantities $\rho_0(\eta)$ and/or $\rho(\eta, \kappa_1)$ to implement additional measures to improve responsiveness and to further protect against jackknife. Such measures might include further limiting the scaled curvature input k(t) or, as explained below, limiting the vehicle speed.

It may be desirable to limit vehicle velocity $v_1$ to ensure that the system 10 remains active. Furthermore, jackknife avoidance is improved by reducing the maximum allowed vehicle speed as the hitch angle approaches $\gamma_{jk}$. Therefore, hitch angle-dependent speed limiting is a desirable component of the current TBA system.

Previously disclosed systems, including the above-mentioned co-pending, commonly assigned U.S. Patent Application Pub. No. 2016/0288786, now U.S. Pat. No. 9,623,859, the entire disclosure of which is hereby incorporated by reference herein, have employed a speed limiting system consisting of a speed limit generation module and a controller that issues commands to the powertrain and brakes in order to attempt to maintain the vehicle velocity $v_1$ at or below the given limit. The speed limit generation module takes the hitch angle $\gamma$ as an input. The speed limit output is maximal when the hitch angle $\gamma$ is near zero, and decreases as the hitch angle $\gamma$ approaches the boundary of the jackknife region. This approach to speed limit generation therefore requires knowledge of the hitch angle $\gamma$, trailer length D and hitch offset L.

Figure 11:
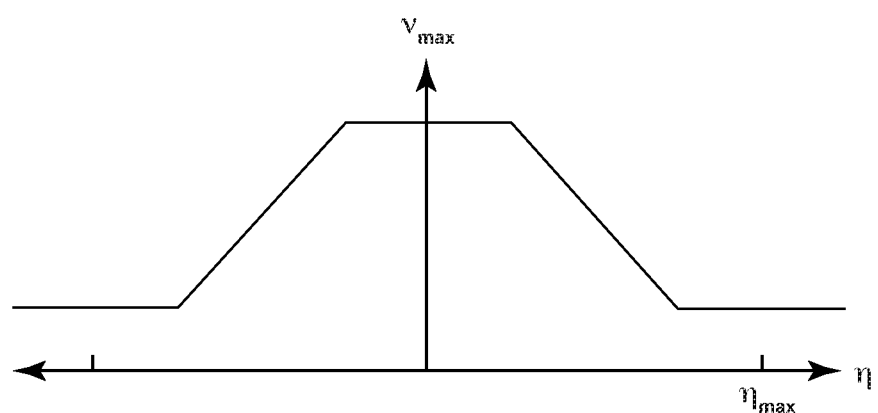
FIG. 11 is a graph depicting an example output of a modified curvature dependent speed limiting module.

A "parameterless" scheme of speed limiting hitch angle $\gamma$, without directly measuring it, and without knowing trailer length D or hitch offset L can be realized by specifying the desired speed limit $v_{max}$ as a function of the modified curvature $\eta$ or, specifically, of the jackknife proximity measures $\rho_0(\eta)$ and/or $\rho(\eta, \kappa_1)$. When L=0, this method is completely analogous to the current, hitch angle-based method. When L≠0, we can instead use the value $\rho(\eta, \kappa_1)$ in place of $\eta$, and the limits ±1 in place of $+\eta_{max}$, as illustrated in FIG. 11.

As discussed above, controller 28 can compute the modified curvature $\eta$ from velocity $v_1$ and trailer yaw rate $\omega_2$ measurements as long as the vehicle velocity $v_1$ is nonzero. Furthermore, if the vehicle 14 is in motion and subsequently comes to a stop, we have only to recall the last value of $\eta$ before the velocity $v_1$ reaches zero, as long as it is safe to assume that the hitch angle $\gamma$ is unchanged. In practice, however, it is useful to modify this strategy for estimating the modified curvature $\eta$.

First, it may be desirable to specify some positive threshold $\epsilon_{v1}$, and to update the estimate of $\eta$ only when $|v_1| > \epsilon_{v1}$. In addition to avoiding an indeterminate condition (i.e. divide-by-zero), this modification may also reduce the effect of velocity sensor nonlinearities.

Second, a low-pass filter can be applied to the estimate of the modified curvature $\eta$. The filter attenuates sensor noise (including quantization noise), which would otherwise have a significant effect on the estimate of $\eta$ at low speeds. With a suitable realization, the filter state can be used to hold the value of the modified curvature $\eta$ while updates are disabled. One such realization in discrete-time is given by:

$$\hat{\eta}[k] = \begin{cases} a\frac{\omega_2[k]}{v_1[k]} + (1-a)\hat{\eta}[k-1], & \text{if } |v_1| > \epsilon_{v1}, \\ \hat{\eta}[k-1], & \text{otherwise,} \end{cases} \quad (19)$$

where $a \in [0,1]$ is the normalized filter bandwidth.

Steering dynamics and steering angle $\delta$ rate limiting may introduce a variable delay between steering commands from controller 28 and the resulting wheel angle $\delta$. This delay can cause oscillation of the steering angle δ. The frequency of oscillation is largely determined by the steering dynamics and the effective delay. One method to reduce or eliminate such oscillation is to apply a notch filter to the steering command output. Doing so may be achieved with a two-pole discrete time filter according to:

$$H(z^{-1}) = 1 - \left(\frac{a_1}{1-(1-a_1)z^{-1}}\right)\left(1 - \frac{a_2}{1-(1-a_2)z^{-1}}\right), \quad (20)$$

where $a_1, a_2 \in [0,1]$ are the normalized lower and upper stopband limits.

Returning to the proportional gain $K_p$ used by controller 28, the maximum admissible gain $K_{p,max}$ is noted as being proportional to $D + L \cos \bar{\gamma}$. Thus, if estimates of trailer length D and hitch offset L are available (or even just an estimate of trailer length D, which is the dominant part of the relationship $D + L \cos \bar{\gamma}$), it is possible to scale the proportional gain $K_p$ by the estimates in order to increase the rate of convergence for long trailers. For example, given an estimated trailer length $\hat{D}$, it is possible to let $K_p = \bar{K}_p \hat{D}$, where $\bar{K}_p$ is a tunable constant.

Figure 12:
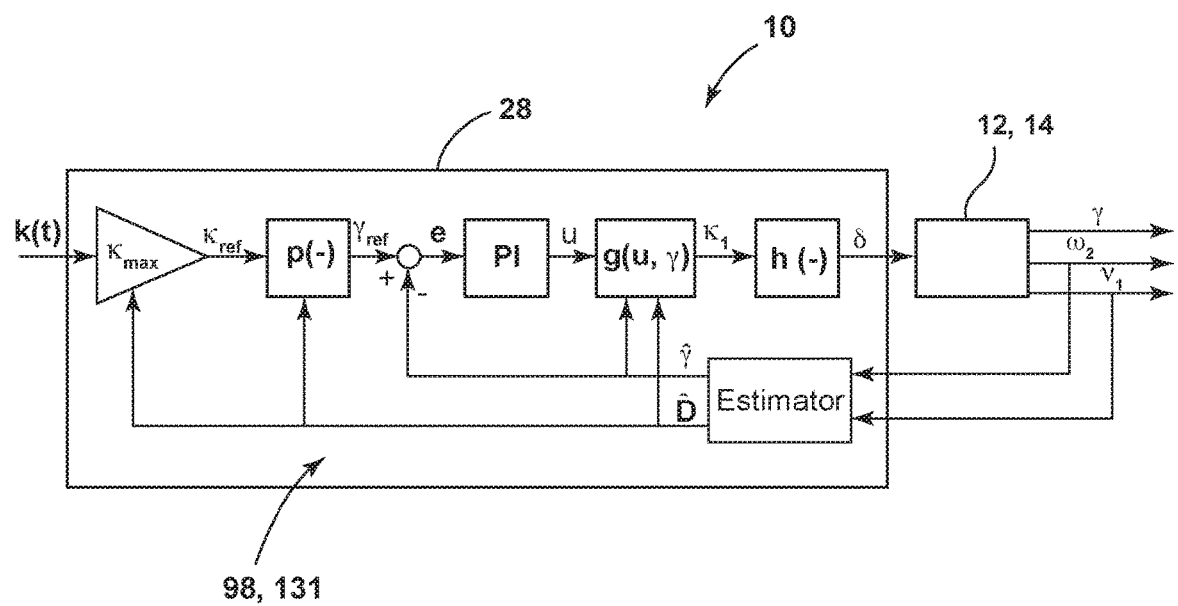
FIG. 12 is an alternative controller that can be used in a system that also incorporates the controller of FIG. 7 or FIG. 8 in a quick-start scheme.

In a further aspect, the above-described TBA system incorporating the disclosed modified curvature (or other trailer yaw rate-based) control scheme can be used as a quick-start function in a variation of system 10 that includes a variation of controller 28 capable of implementing at least the standard curvature control routine 98 according to a curvature command k(t) received from knob 30 and to output a control signal to the steering system 62 (FIG. 2) to achieve a desired steering angle δ is shown in FIG. 12 that is based on a desired trailer curvature $\kappa_2$. For example, system 10 can use sensor module 20, including a trailer yaw rate sensor 25 to estimate the hitch angle γ using the trailer yaw rate $\omega_2$ and the vehicle yaw rate $\omega_1$ according to the relationship:

$$\gamma = \sin^{-1} \frac{v_1 \omega_2 D + v_2 \omega_1 L}{v_1^2 + \omega_1^2 L^2}. \quad (21)$$

Such a variation of system 10 is further described in co-pending, commonly-assigned U.S. Pat. No. 9,340,228, the entirety of which is incorporated herein by reference.

In order to cope with an unknown trailer length, specific conditions were identified under which the instantaneous hitch angle γ may be estimated independent of trailer length D. As discussed further in co-pending, commonly-assigned U.S. patent application Ser. No. 14/736,391, now U.S. Pat. No. 9,821,845, the entirety of which is incorporated herein by reference, a controller 28, as shown in FIG. 12, can wait for the specified conditions (which may, for example, include a steady-state condition, indicated by a zero trailer yaw rate $\omega_2$ or straight, forward driving with the steering angle δ equal to zero for a predetermined interval) to occur, then estimates an initial, or reference, hitch angle $\gamma_{ref}(t_0)$. In an embodiment, subsequent filtering can allow for a form of so-called "simultaneous" estimation of trailer length D and hitch angle γ, which can be in the form of integrated or simultaneous applications of the estimation routine 131 and the standard curvature routine 98 illustrated in FIG. 2. This estimation routine 131 has been demonstrated in closed loop with the standard curvature control routine 98. Various methods have also been developed for estimating trailer length D from hitch angle γ measurements.

It is noted that both the standard curvature routine 98 and estimation routine 131 are illustrated in dashed lines in FIG. 2 to indicate that these items, in particular, are optional and pertain to systems according to this present embodiment. As discussed above, routines using the trailer yaw rate $\omega_2$, such as the disclosed modified curvature variation of trailer yaw rate-based routine 134, can be implemented as the sole control for assisting in reversing the trailer 12. Further, the use of dashed lines with respect to the standard routine 98 and the estimation routine 131 does not imply that all other features shown in FIG. 2 are required, as modifications to system 10 can be made that implement variations of the trailer yaw rate-based control scheme disclosed herein.

Whether the hitch angle γ or only the trailer yaw rate $\omega_2$ is measured, reliable estimation of trailer length D requires a moderate change in hitch angle γ. Accordingly, the accuracy of an estimate depends on the maneuver executed. Furthermore, when the hitch angle γ must be estimated on the basis of trailer yaw rate $\omega_2$ measurements, current methods cannot provide either a trailer length D or a hitch angle γ estimate until the maneuver satisfies particular conditions. These factors limit the ability of the controller 98 to meet desired performance criteria during some initial learning period whose duration is maneuver-dependent. During such a learning period, the controller 28 may be conservative with respect to meeting driver-requested curvature, and may fail to prevent jackknife under certain conditions.

Figure 13:
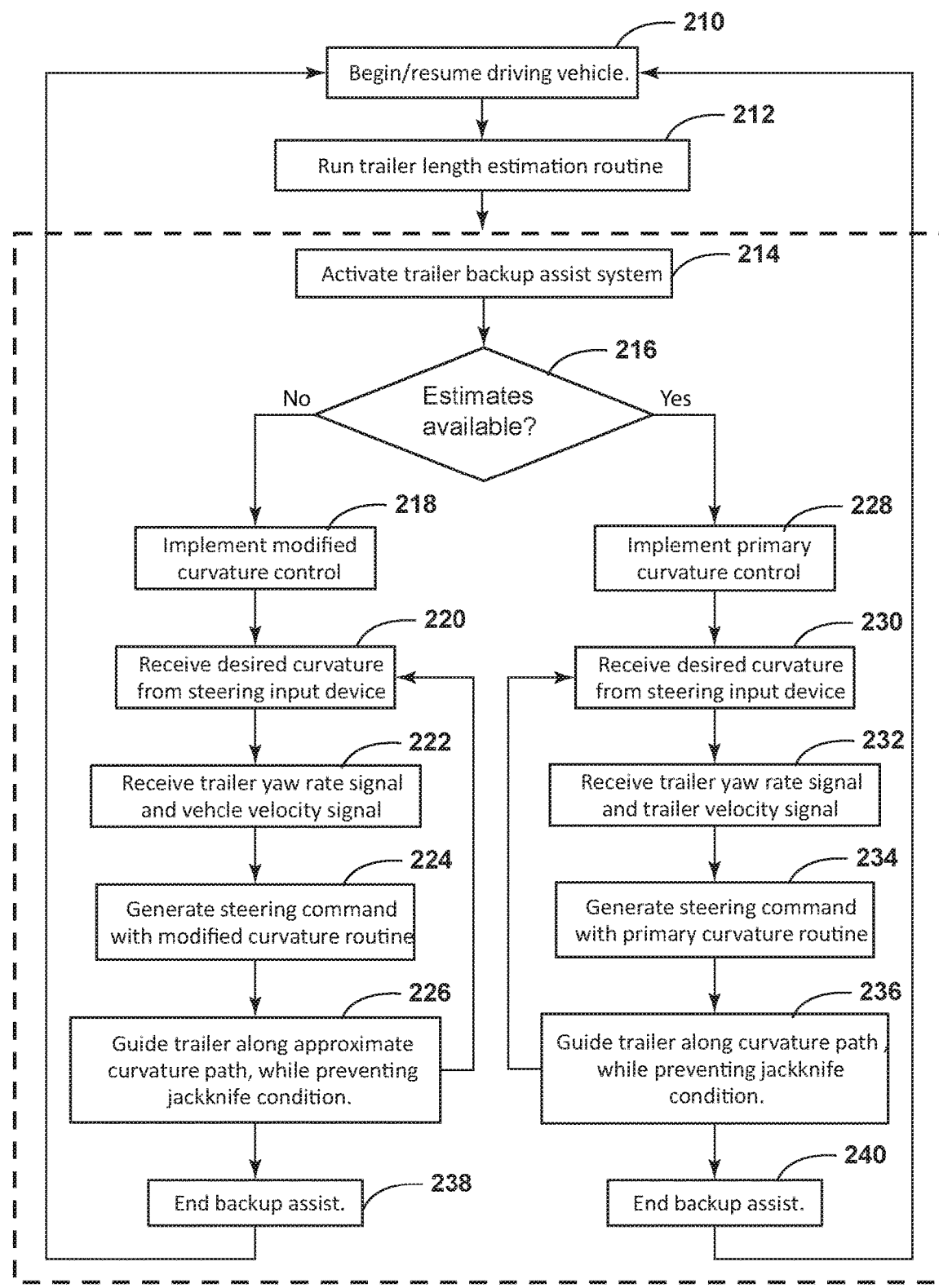
FIG. 13 is a flow chart showing example logic of the system implementing a yaw rate-based curvature control scheme as a quick start mode in a system that also uses the trailer curvature control scheme of FIG. 12.

As discussed above, the modified curvature η can use the trailer yaw rate $\omega_2$, as well as the vehicle velocity $v_1$ to control vehicle 14 in reversing trailer 12 without knowing hitch angle γ, trailer length D, or hitch offset L. Because both the trailer yaw rate $\omega_2$, as well as the vehicle velocity $v_1$, are used in estimating hitch angle γ and trailer length D in the controller 28 implementing the modified curvature routine 134 depicted in FIG. 8, the control scheme based on the modified curvature η, described herein, is suited for a "quick-start" TBA function, where no customer-provided measurements are needed and no learning period is imposed. In this manner, as shown in FIG. 13, system 10 can implement routine 28 (or multiple controllers with appropriate logic and circuitry to dictate the use of the appropriate controller) that can implement the hitch angle estimation routine 131 as a part of the control scheme of FIG. 8 to estimate the hitch angle γ and the trailer length D (from which the hitch offset L can be derived), while using the modified curvature routine 134 of FIG. 8, discussed herein, until adequate estimates have been obtained, at which point, the control scheme of FIG. 12 can be used to further implement the standard curvature routine 98 to both control system 10 based on the trailer curvature $\kappa_2$. Such a scheme may continuously estimate the hitch angle γ during such use and, if needed, may continue to refine the trailer length D estimate.

As shown in FIG. 13, a single implementation of system 10 can selectively use both standard curvature routine 98 and modified curvature routine 134, as discussed above. As shown, the system 10 can utilize controller 28, or multiple controllers on a selective basis, not only to implement the standard curvature routine 98, but also to estimate trailer length D and hitch offset L under certain conditions using the estimation routine 131. As discussed above, if those conditions are not met, the needed estimates may not be available or may be accurate enough to derive the hitch angle γ, as required to use the standard curvature routine 98 to control backing of trailer 12 by vehicle 14. Accordingly, system 10, during driving of vehicle 14 to tow trailer 12 (step 210), such as along a pull-through path (PTP in FIG. 6), may continuously work to derive useable estimates for trailer length D and hitch offset L (step 212). Accordingly, if the driver initiates the use of system 10 by requesting use of the TBA functionality (step 214), system 10 can first determine if acceptable estimates for trailer length D and hitch offset L are available (step 216). If the estimates are not available, system 10 can implement the modified curvature routine 134 of FIG. 8 in the quick-start mode according to steps 218-226, wherein the controller 28 uses the vehicle velocity $v_1$ and the trailer yaw rate $\omega_2$ received, respectively, from vehicle sensor module 17 and trailer sensor module 16 to steer vehicle 14 to maintain the modified curvature $\eta$ as close as possible to the desired modified curvature $\eta_d(t)$, as discussed above. In a variation, while steering vehicle 14 using the modified curvature routine 134, controller 28 may continue to derive estimates for trailer length D and hitch offset L, using the estimation routine 131, and, if suitable estimates become available, may switch to the primary curvature control routine.

If, however, in step 216, it is determined that acceptable estimates for trailer length D and hitch offset L are available, controller 28 can implement the standard curvature routine 98 according to FIG. 12 solely to maintain trailer 12 along a backing path that substantially matches the normalized curvature input k(t), as shown in steps 228-236. When either mode is ended (steps 238 and 240, respectively, normal driving resumes (step 210), with continued estimation of trailer length D and hitch offset L, if necessary (step 212).

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A system for assisting a vehicle in reversing a trailer, comprising:
   a vehicle steering system;
   a trailer control input device outputting a user-selectable control value indicating a desired trailer path radius of curvature about a center of rotation;
   a vehicle sensor outputting a vehicle velocity;
   a trailer sensor outputting data including a trailer yaw rate; and
   a controller:
   receiving the control value, vehicle velocity and trailer yaw rate;
   determining a vehicle path radius of curvature about the center of rotation using the trailer yaw rate received from the trailer sensor and the vehicle velocity; and
   controlling the steering system during reversing of the vehicle and trailer to maintain the vehicle path on the desired trailer path.

2. The system of claim 1, wherein
   the vehicle curvature is determined by the controller as the trailer yaw rate received from the trailer sensor divided by the vehicle velocity received from the vehicle sensor.

3. The system of claim 1, wherein:
   the controller determines the control value as a function of a position of the trailer control input device.

4. The system of claim 3, wherein the controller scales the position of the trailer control input device when determining the predetermined value by a constant.

5. The system of claim 1, wherein:
   the vehicle sensor further outputs a vehicle yaw rate;
   the controller further:
   estimates a hitch angle using the vehicle yaw rate received from the vehicle sensor and the trailer yaw rate received from the trailer sensor;
   determines an estimated trailer length using the estimated hitch angle and the vehicle velocity received from the vehicle sensor, in view of a kinematic relationship;
   controls the vehicle steering system in reversing the trailer to maintain the vehicle path on the desired trailer path, until the estimated trailer length is determined; and
   upon determining the estimated length of the trailer, controls the vehicle steering system in reversing the trailer using the estimated length of the trailer and an instantaneous hitch angle to maintain the trailer along the desired trailer path.

6. The system of claim 5, wherein the controller controls the vehicle steering system in reversing the trailer to cause the control parameter based on the trailer yaw rate and the vehicle velocity to converge toward the predetermined value, until the estimated trailer length is determined within a predetermined accuracy range.

7. The system of claim 1, wherein the controller further controls the steering system to maintain a condition of the vehicle in reversing the trailer outside a jackknife condition.

8. The system of claim 1, further including a vehicle brake system, wherein the controller further controls the vehicle brake system to attempt to maintain the vehicle velocity below a limit that is a function of the vehicle path radius of curvature.

9. The system of claim 1, wherein the controller implements a control scheme including proportional and integral gains determined using an estimated maximum trailer length and an estimated minimum hitch offset to determine a steering angle of the steering system to maintain the vehicle path on the desired trailer path.

10. A vehicle, comprising:
a steering system;
a trailer control input device outputting a user-selectable curvature;
a vehicle sensor outputting a velocity of the vehicle; and
a controller:
determining a trailer yaw rate based on data received from a trailer sensor coupled with the controller;
determining a vehicle path curvature using the vehicle velocity received from the vehicle sensor and the trailer yaw rate received from the trailer sensor; and
controlling the vehicle steering system to converge the vehicle path curvature to the user-selectable curvature received from the trailer control input device.

11. The vehicle of claim 10, wherein:
the vehicle path curvature is determined by the controller as the trailer yaw rate received from the trailer sensor divided by the vehicle velocity received from the vehicle sensor.

12. The vehicle of claim 10, wherein
the controller scales the user-selectable curvature by a constant.

13. The vehicle of claim 10, wherein:
the vehicle sensor further outputs a vehicle yaw rate; and
the controller:
determines an estimated trailer length using the vehicle yaw rate received from the vehicle sensor and the trailer yaw rate received from the trailer sensor;
determines that the estimated trailer length is unavailable when either no estimate has been obtained or when the estimated trailer length is outside an acceptable accuracy range; and
controls the vehicle steering system to converge the vehicle path curvature to the user-selectable curvature received from the trailer control input device when the estimated trailer length is determined to be unavailable.

14. The vehicle of claim 13, wherein
the controller further:
estimates a hitch angle using the vehicle yaw rate received from the vehicle sensor and the trailer yaw rate received from the trailer sensor;
determines the estimated length of the trailer using the estimated hitch angle and the vehicle speed in view of a kinematic relationship of the vehicle in combination with the trailer; and
upon determining the estimated length of the trailer, controls the vehicle steering system in reversing the trailer to cause a curvature of the trailer, derived using the estimated length of the trailer and the estimated hitch angle, to converge toward the user-selectable curvature.

15. The vehicle of claim 10, wherein the controller further controls the steering system to maintain a condition of the vehicle in reversing the trailer outside a jackknife condition.

16. A method for assisting a vehicle in reversing a trailer, comprising:
receiving a user-selected curvature;
receiving a vehicle velocity signal;
receiving a trailer yaw rate signal; and
controlling a vehicle steering system by:
determining a vehicle path curvature of the vehicle reversing the trailer using the vehicle velocity signal and the trailer yaw rate signal; and
causing the vehicle path to converge toward the user-selected curvature.

17. The method of claim 16,
wherein the user-selected curvature is received as a position of a curvature input device and is scaled by a constant.

18. The method of claim 16, further including:
receiving a vehicle yaw rate signal;
determining an estimated trailer length using the vehicle yaw rate signal and the trailer yaw rate signal;
when the estimated trailer length is unavailable or when the estimated trailer length is outside an acceptable accuracy range, controlling a vehicle steering system by causing the vehicle path to converge toward the user-selected curvature.

19. The method of claim 18, further including:
determining an estimated hitch angle using the vehicle yaw rate signal and the trailer yaw rate signal, wherein the estimated length of the trailer is further determined using the vehicle velocity signal and the estimated hitch angle in view of a kinematic relationship of the vehicle in combination with the trailer; and
upon determining the estimated length of the trailer, controlling the vehicle steering system by causing a trailer path to converge toward the user-selected curvature.

20. The method of claim 16, wherein controlling the steering system further includes maintaining a condition of the vehicle in reversing the trailer outside a jackknife condition.

* * * * *